United States Patent Office 2,873,285
Patented Feb. 10, 1959

2,873,285

1,4,17(20)-PREGNATRIENES

Jerome Korman, Portage Township, Kalamazoo County, and John A. Hogg, Kalamazoo Township, Kalamazoo County, Mich., assignors to The Upjohn Company, Kalamazoo, Mich., a corporation of Michigan No Drawing. Original application January 31, 1955, Serial No. 485,317. Divided and this application December 6, 1955, Serial No. 551,230

4 Claims. (Cl. 260—397.45)

This invention relates to intermediates in the preparation of $\Delta^1$-cortisone and 21-esters of $\Delta^1$-cortisone. This application is a division of application S. N. 485,317, filed January 31, 1955, and a continuation-in-part of application S. N. 406,364, filed January 26, 1954, now Patent No. 2,774,775.

It is an object of the present invention to provide intermediates for novel $\Delta^1$-cortisone and 21-esters thereof. Another object is the provision of a process for the production of said intermediates. Other objects will be apparent to those skilled in the art to which this invention pertains.

The novel $\Delta^1$-cortisone and preferred 21-esters thereof are represented by the following formula:

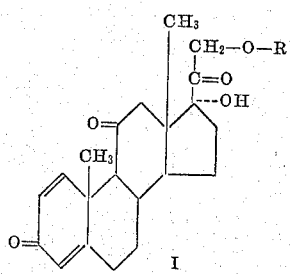

I wherein R is hydrogen or the acyl radical of an organic carboxylic acid, preferably containing from one to twelve carbon atoms, and especially hydrocarbon carboxylic acids containing from one to eight carbon atoms, particularly acetic acid. $\Delta^1$-cortisone (I, R is H) and $\Delta^1$-cortisone acetate (I, R is acetyl) are the preferred compounds.

The novel intermediates of the present invention have the following structural formula:

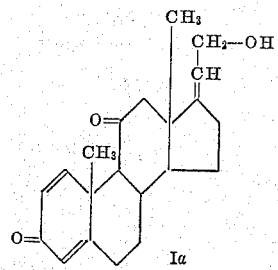

Ia and include the 21-organic carboxylic acid esters thereof wherein the acyl radical contains from one to twelve carbon atoms, inclusive. It also includes the 3-pyrrolidyl enamines thereof and the 3-cyclic ketals thereof in which the ketal forming glycol is a lower-aliphatic alkylene glycol such as ethylene glycol. The invention moreover includes the 3-enol ethers of the above compound.

$\Delta^1$-cortisone and 21-esters thereof possess modified adrenal cortical hormone activity, the 21-esters modifying the activity of $\Delta^1$-cortisone somewhat, e. g., prolongation of activity, enhanced activity by some routes of administration, greater oil and/or water solubility, improved taste, greater stability, lower-melting, etc. These compounds possess marked anti-inflammatory activity and are valuable in the treatment of rheumatoid arthritics. In addition, these compounds possess other activities not ordinarily associated with cortisone and esters thereof, e. g., androgenic activity.

$\Delta^1$-cortisone and 21-esters thereof, especially 21-esters wherein the acyl radical is that of an organic carboxylic acid containing from one to twelve carbon atoms, inclusive, preferably hydrocarbon carboxylic acids containing from one to eight carbon atoms, inclusive, e. g., loweraliphatic, especially $\Delta^1$-cortisone acetate, has an order of activity surprisingly greater than cortisone and its 21-esters, in some instances being up to ten times greater as an anti-arthritic without possessing significant salt retention activity. Furthermore, the spectrum of activity of the compounds of the present invention is surprisingly different from the corresponding cortisone and esters thereof, as well as differing in degree in the activities common to both the natural hormone and the $\Delta^1$-compound. Furthermore, the novel compounds of the present invention are frequently useful in the treatment of rheumatoid arthritics and other arthritics who have not responded to therapy with cortisone or cortisone acetate.

$\Delta^1$-cortisone and 21-esters thereof, e. g., the 21-formate, acetate, propionate, butyrate, cyclopentylpropionate, dimethylacetate, trimethylacetate, phenylacetate, phenylpropionate, succinate, benzoate and the like, of these compounds are prepared in the same manner disclosed in application Serial No. 346,274 filed April 1, 1953, now Patent No. 2,790,814, for the production of hydrocortisone, i. e., protecting the 3-keto group of a 3,11-diketo-1,4,17(20)-pregnatriene-21-oic acid lower-alkyl ester such as propyl, ethyl, or methyl 3,11-diketo-1,4,17(20)-pregnatriene-21-oate with an enol ether, cyclic ketal, or preferably with a pyrrolidyl enamine, then reducing the 21-carbonyloxy group with lithium aluminum hydride, lithium borohydride, or the like, followed by the hydrolysis, usually with acid, of the enamine group to regenerate the $\Delta^{1,4}$-3-keto group, acylation of the 21-hydroxy group to produce an 11$\beta$-hydroxy-21-acyloxy-1,4,17(20)-pregnatriene-3-one, oxidizing the 11$\beta$-hydroxy group to an 11-keto group with chromic acid in glacial acetic acid at zero degrees centigrade and then introducing the 17$\alpha$-hydroxy-20-keto group by reaction of the thus-produced 21-acyloxy steroid with hydrogen peroxide and a small proportion of osmium tetroxide, to produce a 17$\alpha$-hydroxy-21-acyloxy-1,4-pregnadiene-3,11,20-trione which is physiologically active per se and can be converted by known chemical means into the physiologically active adrenal cortical hormones, e. g., hydrogenating the double bonds and then brominating the 4-position followed by dehydrohalogenation.

These reactions may be illustrated as follows:

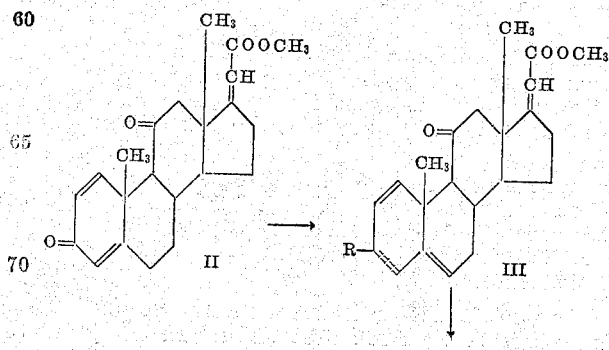

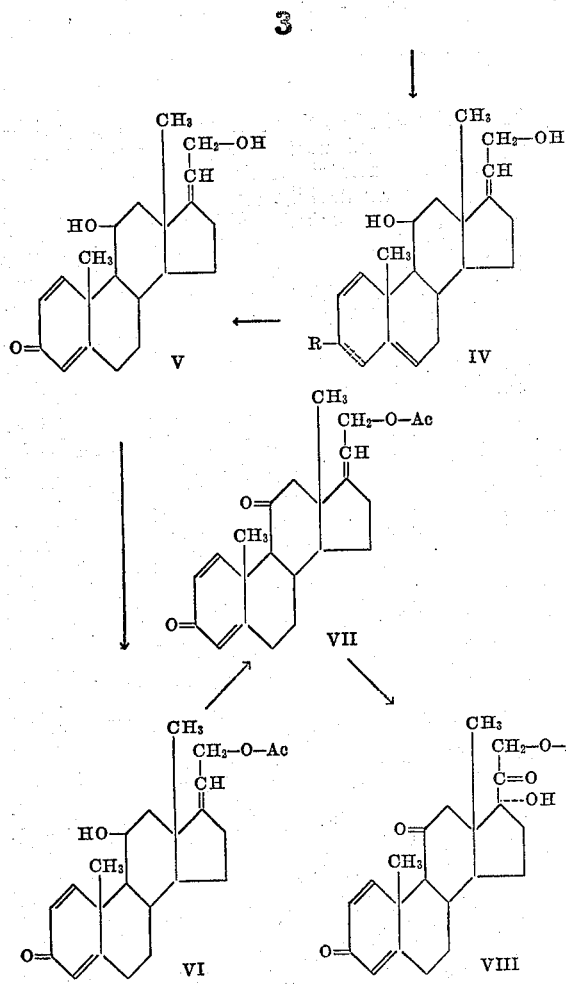

wherein R represents a suitably protected 3-keto group, i. e., an enamine, cyclic ketal or enol ether group, and Ac is the acyl radical of an acid defined hereinbefore, and the dotted line represents a 4(5)-double bond which is present when the protecting group is an enamine or enol ether.

The novel $\Delta^1$-compounds, especially $\Delta^1$-cortisone and $\Delta^1$-cortisone acetate are useful in the treatment of maladies in both humans and valuable domestic animals, e. g., inflammations of the skin, nose, ears, and eyes caused by bacterial or fungal infections, contact dermatitis or physiological maladjustment.

The novel 17α,21-dihydroxy-1,4-pregnadiene-3,11,20-trione and 17α-hydroxy-21-acyloxy-1,4-pregnadiene-3,11,20-triones are especially useful as pharmaceutical compositions and mixtures, e. g., ointments, lotions, greases, creams, aqueous suspensions, etc., for topical use. Examples of especially advantageous pharmaceutical compositions are listed below. Although the examples are to the 17α,21-dihydroxy-1,4-pregnadiene-3,11,20-trione and 17α-hydroxy-21-acetoxy-1,4-pregnadiene-3,11,20-trione, it is to be understood that the other 21-esters of $\Delta^1$-cortisone are substitutable therein.

The novel 17α-hydroxy-21-acetoxy-1,4-pregnadiene-3,11,20-trione is advantageously employed as a topical ointment for use on the skin or in the eyes in the treatment of topical inflammatory conditions. A suitable topical and ophthalmic ointment has the following composition:

| | Lbs. |
|---|---|
| 20 percent wool fat, U. S. P. | 100 |
| 25 percent white mineral oil, U. S. P. | 125 |
| 0.5 percent 17α-hydroxy-21-acetoxy-1,4-pregnadiene-3,11,20-trione (micronized) | 2.5 |
| White petrolatum, U. S. P., q. s. ad | 500 |

The wool fat and petrolatum are melted and strained into a suitable container. The temperature is adjusted to 113 degrees Fahrenheit. The steroid is mixed with ninety pounds of strained mineral oil and milled through a Fitzpatrick mill. The mill is washed with 35 pounds of strained mineral oil. The steroid mixture and mill washings are added to the base and the base then stirred with a high speed mixer until congealed.

Incorporation of an antibiotic in the ointment, e. g., oxytetracyclin, chlortetracyclin, tetracyclin, penicillin, and especially neomycin sulfate or a sulfonamide, e. g., 3,4-dimethyl-5-sulfanilamido-isoxazole, has surprising therapeutic advantages each active ingredient potentiating and supplementing the useful properties of the other in a fashion more particularly described in the copending application of Dale, S. N. 458,679, filed September 27, 1954. Such an ointment, exemplified by the use of neomycin sulfate, is as follows:

| | Lbs. |
|---|---|
| 20 percent wool fat, U. S. P. | 100 |
| 25 percent white mineral oil, U. S. P. | 125 |
| 0.6 percent neomycin sulfate (microatomized) | 3 |
| 1.0 percent 17α-hydroxy-21-acetoxy-1,4-pregnadiene-3,11,20-trione (micronized) | 5 |
| White petrolatum, U. S. P., q. s. ad | 500 |

An injectable composition suited for suspending the compounds of the present invention, which has advantages in the treatment of Addisonian crisis and in shock is as follows:

| | Mg. |
|---|---|
| Sodium citrate, U. S. P. | 5.7 |
| Sodium carboxymethylcellulose, low viscosity | 2.0 |
| Plasdone (polyvinylpyrrolidone) | 10.0 |
| Polysorbate 80, U. S. P. | 4.0 |
| Sterile methylparaben, U. S. P. | 1.5 |
| Sterile propylparaben, U. S. P. | 0.2 |
| 17α-hydroxy-21-acetoxy-1,4 - pregnadiene - 3,11,20-trione | 10.0 |

Water for injection, sufficient to make up 1.0 cc.

The suspending agents in this vehicle, i. e., the combination of polyvinylpyrrolidone-sodium carboxymethylcellulose, or a polyalkylene glycol, are particularly useful when used in conjunction with the novel $\Delta^1$-physiologically active steroids disclosed herein, make an especially useful combination which produces stable suspensions or suspensions which are readily resuspendible which prevents undue caking as more particularly pointed out in the copending application of Cronin and Hennig, S. N. 427,676, filed May 4, 1954, and of Sponnoble and Hamlin, S. N. 471,512, filed November 26, 1954.

Another composition suitable for injection has the following composition:

2.5 grams sterile micronized 17α,21-dihydroxy-1,4-pregnadiene-3,11,20-trione
3.0 grams polyethylene glycol 4000
0.9 gram sodium chloride gran., U. S. P.
0.4 gram Tween 80
1.5 grams benzyl alcohol N. F.
Q. s. 100 cc. water for injection The polyethylene glycol, sodium chloride, Tween 80 and benzyl alcohol are dissolved in water and the solution sterilized by filtration. Sterile 17α,21-dihydroxy-1,4-pregnadiene-3,11,20-trione is then aseptically mixed with the sterile vehicle and the whole homogenized.

The following examples are illustrative of the process and products of the present invention, but are not to be construed as limiting.

EXAMPLE 1

*3-ethylene glycol ketal of 3,11-diketo-1,4,17(20)-pregnatriene-21-oic acid methyl ester*

To a solution of 1.5 grams (0.0042 mole) of 3,11-diketo-1,4,17(20)-pregnatriene-21-acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100-milliliter portions of methylene chloride containing increasing proportions of acetone. There was thus eluted the 3-ethylene glycol ketal of 3,11-diketo-1,4,17(20)-pregnatriene-21-oic acid methyl ester.

EXAMPLE 2

*3-ethylene glycol ketal of 11β,21-dihydroxy-1,4,17(20)-pregnatriene-3-one*

A solution of 1.50 grams of the 3-ethylene glycol ketal of 3,11-diketo-1,4,17(20)-pregnatriene-21-oic acid methyl ester in seventy milliliters of benzene was added dropwise to a stirred mixture of 1.50 grams of lithium aluminum hydride and fifty milliliters of anhydrous ether. When addition was complete, the reaction mixture was refluxed for one-half hour whereafter the mixture was cooled to room temperature. Fifty milliliters of water was then cautiously added to the stirred reaction mixture to decompose the excess lithium aluminum hydride, followed by 200 milliliters of methylene chloride. The whole was then centrifuged to facilitate separation of the organic and aqueous phases. The organic phase was separated, the solvent distilled and the residue was crystallized from a mixture of ethyl acetate and Skellysolve B hexane hydrocarbons to give crystalline 3-ethylene glycol ketal of 11β,21-dihydroxy-1,4,17(20)-pregnatriene-3-one.

EXAMPLE 3

*11β,21-dihydroxy-1,4,17(20)-pregnatriene-3-one*

A solution of 0.572 gram (0.0015 mole) of the 3-ethylene glycol ketal of 11β,21-dihydroxy-1,4,17(20)-pregnatriene-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water were then added, the methylene chloride layer removed, and the solvent distilled therefrom. The residue, after drying in vacuo, consisted of 11β,21-dihydroxy-1,4,17(20)-pregnatriene-3-one.

EXAMPLE 4

*11β,21-dihydroxy-1,4,17(20)-pregnatriene-3-one*

A solution of 1.0 gram of 3,11-diketo-1,4,17(20)-pregnatriene-21-oic acid methyl ester, 0.5 milliliter of pyrrolidine, and 1.5 milligrams of para-toluenesulfonic acid in 100 milliliters of benzene were heated at the reflux temperature of the mixture for 45 minutes with the concomitant removal of the water of reaction. The solvent was distilled from the mixture to leave a residue consisting essentially of 3-pyrrolidyl-11-keto-1,3,5,17(20)-pregnatetraene-21-oic acid methyl ester.

This residue was dissolved in five milliliters of benzene, a suspension of 376 milligrams of lithium aluminum hydride in 290 milliliters of ether was added thereto over a period of five minutes, and the mixture was stirred at room temperature for one hour. Three milliliters of ethyl acetate was added to destroy excess lithium aluminum hydride, followed by five milliliters of water. The ether was distilled at atmospheric pressure from the mixture to leave a residue consisting essentially of 3-pyrrolidyl-11β,21-dihydroxy-1,3,5,17(20)-pregnatetraene and inorganic material.

This crude distillation residue was mixed with 327 milliliters of methanol at 55 degrees centigrade until solution was effected and then cooled to 37 degrees centigrade. 116.5 milliliters of an aqueous five percent sodium hydroxide solution was added thereto and heating of the mixture at about forty degrees centigrade was continued for ten minutes. The solution was neutralized with 3.5 milliliters of acetic acid at below 37 degrees centigrade and the solvent distilled therefrom at reduced pressure and at a temperature below 45 degrees centigrade. The 140 milliliters of residue was mixed with a mixture of 370 milliliters of water and 170 milliliters of concentrated sulfuric acid, stirred for twenty minutes and then filtered and washed with water to give 11β,21-dihydroxy-1,4,17(20)-pregnatriene-3-one which melts at 149 to 153 degrees centigrade when recrystallized from ethylene dichloride, has an $[\alpha]_D$ of plus 117 degrees in chloroform, and an $\epsilon_{234}$ of 14,700.

EXAMPLE 5

*11β-hydroxy-21-acetoxy-1,4,17(20)-pregnatriene-3-one*

A solution of 0.518 gram of 11β,21-dihydroxy-1,4,17(20)-pregnatriene-3-one in five milliliters of pyridine was mixed with two milliliters of acetic anhydride and the whole was then maintained at room temperature for seventeen hours whereafter crushed ice was added thereto. The precipitated 11β-hydroxy-21-acetoxy-1,4,17(20)-pregnatriene-3-one was filtered therefrom, dissolved in benzene and then chromatographed over a column of 75 grams of Florisil synthetic magnesium silicate. The column was developed with 75-milliliter portions of Skellysolve B hexane hydrocarbons containing increasing proportions of acetone. There was thus eluted 11β-hydroxy-21-acetoxy-1,4,17(20)-pregnatriene-3-one from the column.

Similarly, 11β,21-dihydroxy-1,4,17(20)-pregnatriene-3-one is converted to other 11β-hydroxy-21-acyloxy-1,4,17(20)-pregnatriene-3-ones by esterification of the 21-hydroxy group, e. g., by reaction with the appropriate acid anhydride, acid chloride or bromide, ester by ester exchange, acid in the presence of an esterification catalyst, etc., 11β,21-dihydroxy-1,4,17(20)-pregnatriene-3-one is similarly converted to other 21-esters thereof. Examples of 11β-hydroxy-21-acyloxy-1,4,17(20)-pregnatriene-3-one prepared include those wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, the optically active abietic, α-ethylisovaleric, an acyclic acid, e. g., 3β-hydroxycholanic, 3β-hydroxyetiocholanic, cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl or alkaryl acid, e. g., benzoic, 2,3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, a dibasic acid (which can be converted to water soluble, e. g., sodium, salts), e. g., succinic, glutaric, α-methylglutaric, β-methylglutaric, β,β-dimethylglutaric, adipic, pimelic, suberic, a hydroxyacid, e. g., glycolic, lactic, citric, tartaric, d-maleic, d-glyceric, mannonic, gluconic, salicylic, an aminoacid, e. g., glycine, diglycollamic, triglycollamic, methylglycine, dimethylglycine, diethylglycine, para-aminosalicylic, para-aminobenzoic, other hetero-substituted acids, e. g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acids, e. g., carbamic acid, phenylcarbamic, n-butylcarbamic, dimethylcarbamic, diethylcarbamic, allophanic, or a heterocyclic acid, e. g., β-furylcarboxylic, N-methylpyrrolidyl-2-carboxylic, α-picolinic, indole-2-carboxylic, 6-hydroxyindolyl-3-acetic, N-methylmorpholyl-2-carboxylic, lysergic, pyrrolyl-2-carboxylic, or other acyl acid.

EXAMPLE 6

11β - hydroxy - 21 - acetoxy - 1,4,17(20) - pregnatriene - 3 - one

A solution of 6.6 grams of 11β,21 - dihydroxy - 1,4,17(20) - pregnatriene - 3 - one in fifteen milliliters of pyridine, prepared at room temperature, was mixed, at zero degrees centigrade, with fifteen milliliters of acetic anhydride. After one hour at room temperature, copious crystallization had taken place in the resulting mixture. After stirring for a total of eighteen hours, the mixture filtered and the cake washed with a 50:50 mixture of pyridine and acetic anhydride, followed by water. The cake was dried to give 4.92 grams of 11β - hydroxy - 21 - acetoxy - 1,4,17(20) - pregnatriene - 3 - one melting at 219 to 223 degrees centigrade. Mixing the original filtrate with water gave 2.12 grams of less pure 11β - hydroxy - 21 - acetoxy - 1,4,17(20) - pregnatriene - 3 - one melting at 186 to 207 degrees centigrade.

EXAMPLE 7

21 - acetoxy - 1,4,17(20) - pregnatriene - 3,11 - dione

To a stirred solution of 0.120 gram (0.0004 mole) of 11β - hydroxy - 21 - acetoxy - 1,4,17(20) - pregnatriene - 3 - one dissolved in 11.9 milliliters of glacial acetic acid and thereafter cooled to fourteen degrees centigrade was added dropwise, over a period of twenty minutes, a solution of 0.055 gram of chromium trioxide dissolved in 1.1 milliliters of glacial acetic acid and 1.1 milliliters of water. The temperature of the stirred solution was thereafter allowed to rise to eighteen degrees centigrade over a period of one hour. The excess chromium trioxide was destroyed by the addition of an aqueous sodium sulfite solution, and the product then extracted from the reaction mixture with three fifteen-milliliter portions of ether which were thereafter combined, washed with water, and dried over anhydrous sodium sulfate. The ether was then removed by evaporation. The residue consisted essentially of 21 - acetoxy - 1,4,17(20) - pregnatriene - 3,11 - dione, which was thereafter purified by chromatographing over a column of ten grams of Florisil synthetic magnesium silicate. The column was developed with forty-milliliter portions of Skelly-solve B hexane hydrocarbons containing increasing proportions of acetone. 21 - acetoxy - 1,4,17(20) - pregnatriene - 3,11 - dione was thus eluted from the column.

Similarly, other 21-organic carboxylic acid esters of 21 - hydroxy - 1,4,17(20) - pregnatriene - 3,11 - dione are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting the selected 11β - hydroxy - 21 - acyloxy - 1,4,17(20) - pregnatriene - 3 - one, wherein the acyl radical is that of an acid named in the paragraphs following Example 5, with an oxidizing agent such as, for example, chromic acid in acetic acid or the like.

EXAMPLE 8

21 - hydroxy - 1,4,17(20) - pregnatriene - 3,11 - dione

Hydrolysis of 21-acetoxy-1,4,17(20) - pregnatriene - 3,11 - dione with sodium hydroxide in methanol is productive of 21 - hydroxy - 1,4,17(20) - pregnatriene - 3,11,20 - trione which can be reesterified, according to the methods described in Example 5, to produce a 21 - acyloxy - 1,4,17(20) - pregnatriene - 3,11 - dione wherein the acyl radical is that of an acid named in the paragraph following Example 5.

EXAMPLE 9

17,21 - dihydroxy - 1,4 - pregnadiene - 3,11,20 - trione- (Δ¹ - cortisone)

To a stirred suspension of 0.124 gram (0.00033 mole) of 21 - acetoxy - 1,4,17(20) - pregnatriene - 3,11 - dione in two milliliters of tertiary butyl alcohol was added 0.26 milliliter of a 2.6 molar solution of hydrogen peroxide in tertiary butyl alcohol and 0.30 milliliter of a solution of 1.00 gram of osmium tetroxide in 100 milliliters of tertiary butyl alcohol. An additional 0.50 milliliter of the above-described osmium tetroxide solution was added to the reaction mixture during the next thirty hours. After the first four hours of reaction time the reaction mixture darkened and became homogeneous. The reaction mixture was stirred and maintained at room temperature for an additional 84 hours, whereafter water and methylene chloride were added thereto. The whole was distilled at reduced pressure to remove the organic solvents and the product was extracted from the residue with methylene chloride, whereafter the extract was freed of solvent by evaporation. The residue, after dissolving in a mixture of five milliliters of methanol and one milliliter of a solution of 0.30 gram of sodium sulfite in five milliliters of water, was heated on a steam bath for thirty minutes. The 17α,21 - dihydroxy - 1,4 - pregnadiene - 3,11,20 - trione was separated therefrom by extraction with methylene chloride, which was thereafter removed by distillation in vacuo. The residue consisted of 17α,21 - dihydroxy - 1,4 - pregnadiene - 3,11,20 - trione (Δ¹ - cortisone) and 17α - hydroxy - 21 - acetoxy - 1,4 - pregnadiene - 3,11,20 - trione as well as 17α,20,21 - trihydroxy - 1,4 - pregnadiene - 3,11 - dione. 17α,21 - dihydroxy - 1,4 - pregnadiene - 3,11,20 - trione melts at 229 to 229.5 degrees centigrade, has an $[\alpha]_D^{23}$ of plus 169 degrees in dioxane and has an $\epsilon_{240}$ of 15,425.

The yield of 17α,21 - dihydroxy - 1,4 - pregnadiene - 3,11,20 - trione is improved by the addition of from about two to seven molar equivalents, calculated on the starting steroid, of pyridine to the starting reaction mixture.

Esterification of the 21-hydroxy group of 17α,21 - dihydroxy - 1,4 - pregnadiene - 3,11,20 - trione, e. g., by reaction with the appropriate acid anhydride, acid chloride or bromide, ester by ester exchange, acid in the presence of an esterification catalyst, etc., is productive of 17α - hydroxy - 21 - acyloxy - 1,4 - pregnadiene - 3,11,20 - trione, examples of which include those wherein the acyl group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, the optically active abietic, α-ethylisovaleric, an acyclic acid, e. g., 3β-hydroxy-cholanic, 3β-hydroxyetiocholanic, cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl or alkaryl acid, e. g., benzoic, 2,3-, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, a dibasic acid (which can be converted to water soluble, e. g., sodium, salts) e. g., succinic, glutaric, α-methylglutaric, β-methylglutaric, β,β-dimethylglutaric, adipic, pimelic, suberic, a hydroxyacid, e. g., glycolic, lactic, citric, tartaric, d-maleic, d-glyceric, mannonic, gluconic, salicylic, an aminoacid, e. g., glycine, diglycollamic, triglycollamic, methylglycine, dimethylglycine, diethylglycine, para-aminosalicylic, para-aminobenzoic, other hetero-substituted acids, e. g., ethymercaptoacetic, benzylmercaptoacetic, cyanoacetic, chloroacetic, fluoroacetic, trichloroacetic, trifluoroacetic, thioglycolic, 2,3,4-trimethoxybenzoic, α-napthoxyacetic, β-pyrrolidylpropionic, carbamic acids, e. g., carbamic acid, phenylcarbamic, n-butylcarbamic, dimethylcarbamic, diethylcarbamic, allophanic, or a heterocyclic acid, e. g., β-furylcarboxylic, N-methylpyrrolidyl-2-carboxylic, α-picolinic, indole-2-carboxylic, 6-hydroxyindolyl-3-acetic, N-methylmorpholyl-2-carboxylic, lysergic, pyrrolyl-2-carboxylic, or other acyl acid.

Example 10

17α-hydroxy-21-acetoxy-1,4-pregnadiene-3,11,20-trione

Following the procedure described in Example 9, exactly, but decomposing the reaction mixture with aqueous sodium sulfite at room temperature for thirty minutes, there is thus-produced 17α-hydroxy-21-acetoxy-1,4-pregnadiene-3,11,20-trione.

Similarly, substituting a 21-ester described in the paragraph following Example 5, as the starting steriod in the reaction described in Example 10, other 21-derivatives of 17α,21-dihydroxy-1,4-pregnadiene-3,11,20-trione are produced, e. g., those named in the paragraph following Example 9.

Example 11

17α-hydroxy-21-acetoxy-1,4-pregnadiene-3,11,20-trione

To a solution of 1.11 grams (3 millimoles) of 21-acetoxy-1,4,17(20)-pregnatriene-3,11-dione in fifty milliliters of tertiary butyl alcohol was added 1.5 milliliters of pyridine followed by 5.02 milliliters of a tertiary butyl alcohol solution of 7.5 millimoles of N-methylmorpholine oxide peroxide (prepared by the reaction of 7.5 millimoles of N-methylmorpholine with 15.0 millimoles of anhydrous hydrogen peroxide in the tertiary butyl alcohol) followed by 18.4 milligrams of osmium tetroxide in ten milliliters of tertiary butyl alcohol. The solution, which, within five minutes had turned orange-red, was maintained for ninety minutes at 25 degrees centigrade. At the end of this time, the now straw colored solution was mixed with 23 milliliters of 0.5 percent aqueous sodium sulfite at room temperature for 25 minutes and then concentrated, at reduced pressure, to a volume of about forty milliliters. This concentrate was stirred for thirty minutes and 35 milliliters of water was then added portionwise over a period of fifteen minutes. After stirring for 45 minutes, the solution which had gradually precipitated crystals, was filtered, washed with a 1:3 mixture of tertiary butyl alcohol and water, and dried to give 17α-hydroxy-21-acetoxy-1,4-pregnadiene-3,11,20-trione which, when pure, melts at 230 to 231.5 degrees centigrade, has an $[\alpha]_D^{23}$ of plus 173 degrees in dioxane and has an $\epsilon_{240}$ of 15,700.

Hydrogenating 17α-hydroxy-21-acetoxy-1,4-pregnadiene-3,11,20-trione with palladium on zinc carbonate catalyst in methanol is productive of 17α-hydroxy-21-acetoxypregnane-3,11,20-trione which, when brominated with bromine in glacial acetic acid and pyridine is productive of 4-bromo-17α-hydroxy-21-acetoxypregnane-3,11,20-trione. Dehydrohalogenation of this compound with pyridine, collidine or semicarbazide followed by decomposition of the semicarbazone in the usual manner, is productive of 17α-hydroxy-21-acetoxy-4-pregnene-3,11,20-trione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of (1) 21-hydroxy-1,4,17(20)-pregnatriene-3,11,dione represented by the following formula:

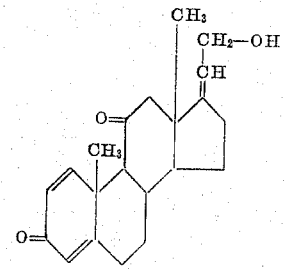

(2) 21-organic carboxylic acid esters thereof wherein the acyl radical contains from one to twelve carbon atoms, inclusive, (3) the 3-pyrrolidyl enamine thereof and (4) 3-cyclic ketals thereof of lower aliphatic alkylene glycols.

2. 21-acyloxy-1,4,17(20)-pregnatriene-3,11-dione represented by the following formula:

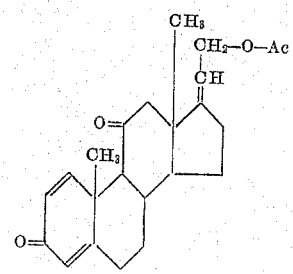

wherein Ac is the acyl radical of a hydrocarbon carboxylic acid containing from one to eight carbon atoms, inclusive.

3. 21-acetoxy-1,4,17(20)-pregnatriene-3,11-dione.
4. 21-hydroxy-1,4,17(20)-pregnatriene-3,11-dione.

References Cited in the file of this patent

UNITED STATES PATENTS

| | | |
|---|---|---|
| 2,707,184 | Hogg | Apr. 26, 1955 |
| 2,715,621 | Hogg | Aug. 16, 1955 |
| 2,736,734 | Sarett | Feb. 28, 1956 |

OTHER REFERENCES

Helv. Chim. Acta, vol. 38 (1955), pp. 835–840.